(12) United States Patent
Schell et al.

(10) Patent No.: US 10,481,041 B2
(45) Date of Patent: Nov. 19, 2019

(54) MEASURING OPTICAL ARRAY POLARITY, POWER, AND LOSS USING A POSITION SENSING DETECTOR AND PHOTODETECTOR-EQUIPPED OPTICAL TESTING DEVICE

(71) Applicant: Fluke Corporation, Everett, WA (US)

(72) Inventors: J. David Schell, Austin, TX (US);
Seymour Goldstein, Austin, TX (US);
Harlan L. Kassler, Austin, TX (US);
Jackson L. Salling, Austin, TX (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/603,087

(22) Filed: May 23, 2017

(65) Prior Publication Data

US 2018/0340861 A1 Nov. 29, 2018

(51) Int. Cl.
*G01M 11/00* (2006.01)
*G02B 6/38* (2006.01)

(52) U.S. Cl.
CPC ........ *G01M 11/335* (2013.01); *G01M 11/333* (2013.01); *G02B 6/385* (2013.01)

(58) Field of Classification Search
CPC ..... G01M 11/335; G01M 11/33; G02B 6/385; G02B 6/3885; G01D 5/268; G01J 1/42; H04B 10/07
See application file for complete search history.

(56) References Cited

U.S. PATENT DOCUMENTS

| | | | | |
|---|---|---|---|---|
| 4,515,479 A | * | 5/1985 | Pryor | G01B 11/00 250/227.21 |
| 4,922,186 A | * | 5/1990 | Tsuchiya | G01R 1/071 324/754.06 |

(Continued)

FOREIGN PATENT DOCUMENTS

| | | |
|---|---|---|
| EP | 2 852 829 | 4/2015 |
| EP | 2 623 948 B1 | 3/2017 |
| WO | 2009/082630 A2 | 7/2009 |

OTHER PUBLICATIONS

TIA Advancing Global Communications, TIA Standard, *Generic Telecommunications Cabling for Customer Premises*, ANSI/TIA-568-C.0-2009, Feb. 2009, 70 pages.

(Continued)

*Primary Examiner* — Mohamed K Amara
(74) *Attorney, Agent, or Firm* — Seed Intellectual Property Law Group LLP

(57) ABSTRACT

An optical testing device is provided. The testing device includes a position sensing detector (PSD) having an optical sensing area that is optically responsive to a first range of wavelengths. The PSD receives a plurality of optical signals having wavelengths within the first range and emitted through a respective plurality of optical fibers and detects a plurality of positions where the optical signals impinged on the optical sensing area for determining array polarity. The PSD receives a plurality of first optical signals having wavelengths within the first range and detects the polarity and a plurality of optical intensities of the first optical (Continued)

signals. The testing device includes a photodetector that is optically responsive to a second range of wavelengths different than the first range. The photodetector receives a plurality of second optical signals within the second range and detects a plurality of optical intensities of the second optical signals.

23 Claims, 11 Drawing Sheets

(56) References Cited

U.S. PATENT DOCUMENTS

| | | | |
|---|---|---|---|
| 5,010,770 A | 4/1991 | Berthold | |
| 5,179,424 A | 1/1993 | Lequime et al. | |
| 5,212,537 A | 5/1993 | Birang et al. | |
| 5,301,001 A | 4/1994 | Murphy et al. | |
| 5,493,406 A | 2/1996 | Sawaki et al. | |
| 5,555,086 A | 9/1996 | vonBieren et al. | |
| 5,729,012 A * | 3/1998 | Wood | F42B 3/113 |
| | | | 250/226 |
| 5,980,120 A | 11/1999 | Narayanan | |
| 6,529,652 B1 | 3/2003 | Brener | |
| 6,591,029 B1 | 7/2003 | Lin et al. | |
| 6,963,119 B2* | 11/2005 | Colgan | G02B 6/43 |
| | | | 257/431 |
| 7,012,236 B2* | 3/2006 | Kole | G01D 5/268 |
| | | | 250/206.1 |
| 7,058,253 B1* | 6/2006 | Novotny | G02B 6/3588 |
| | | | 385/16 |
| 7,233,160 B2* | 6/2007 | Hayden | G01R 1/06772 |
| | | | 324/755.07 |
| 7,237,966 B2* | 7/2007 | Quinby | G02B 6/3851 |
| | | | 385/100 |
| 7,355,420 B2* | 4/2008 | Smith | G01R 1/0735 |
| | | | 324/755.09 |
| 7,423,279 B2 | 9/2008 | Heinz et al. | |
| 7,541,821 B2* | 6/2009 | Gleason | G01R 1/06711 |
| | | | 324/755.09 |
| 7,764,072 B2* | 7/2010 | Strid | G01R 1/06772 |
| | | | 324/149 |
| 7,888,957 B2* | 2/2011 | Smith | G01R 1/07378 |
| | | | 324/754.07 |
| 8,009,959 B2 | 8/2011 | Barnes et al. | |
| 8,410,806 B2* | 4/2013 | Smith | G01R 1/06711 |
| | | | 324/755.01 |
| 8,591,125 B1* | 11/2013 | Thorson | G02B 6/4245 |
| | | | 385/88 |
| 8,692,984 B2 | 4/2014 | Schell et al. | |
| 9,099,352 B2* | 8/2015 | Heck | G01B 11/14 |
| 9,163,960 B2 | 10/2015 | Rao et al. | |
| 9,518,892 B1* | 12/2016 | Schell | G01M 11/33 |
| 9,958,620 B2* | 5/2018 | Ohtsuka | G02B 6/3885 |
| 2002/0031313 A1* | 3/2002 | Williams | G02B 6/3825 |
| | | | 385/92 |
| 2002/0172448 A1* | 11/2002 | Paniccia | G02B 6/3588 |
| | | | 385/16 |
| 2004/0190811 A1 | 9/2004 | Winfield et al. | |
| 2004/0247223 A1 | 12/2004 | Tietjen | |
| 2006/0210214 A1 | 9/2006 | Uhlhorn et al. | |
| 2007/0253662 A1* | 11/2007 | Patel | G01M 11/39 |
| | | | 385/13 |
| 2008/0024789 A1* | 1/2008 | Tobiason | G01D 5/38 |
| | | | 356/521 |
| 2008/0084555 A1 | 4/2008 | Yoo | |
| 2009/0033944 A1 | 2/2009 | Haisch | |
| 2009/0102474 A1* | 4/2009 | Cranch | A01D 89/008 |
| | | | 324/244.1 |
| 2009/0109424 A1 | 4/2009 | Burnett et al. | |
| 2011/0096328 A1 | 4/2011 | Rueck et al. | |
| 2011/0116735 A1* | 5/2011 | Baets | G01D 5/268 |
| | | | 385/12 |
| 2012/0177380 A1* | 7/2012 | Dobbelaere | G02B 6/4214 |
| | | | 398/139 |
| 2013/0038864 A1* | 2/2013 | Flora | G02B 21/0016 |
| | | | 356/73.1 |
| 2014/0056561 A1* | 2/2014 | Lu | G01M 11/33 |
| | | | 385/76 |
| 2015/0062564 A1* | 3/2015 | Kowalczyk | G01M 11/088 |
| | | | 356/73.1 |
| 2015/0369731 A1* | 12/2015 | Taverner | G01N 21/4788 |
| | | | 356/445 |
| 2016/0011041 A1 | 1/2016 | Nakamura et al. | |
| 2016/0041065 A1 | 2/2016 | L'Heureux et al. | |
| 2017/0160371 A1* | 6/2017 | Bockle | G01J 1/42 |
| 2017/0322111 A1* | 11/2017 | Schell | G01M 11/3145 |
| 2019/0078934 A1* | 3/2019 | Weber | G01B 11/2513 |
| 2019/0181275 A1* | 6/2019 | Tsuchiya | G01J 1/02 |
| 2019/0212190 A1* | 7/2019 | Bolognia | G01J 1/0271 |

OTHER PUBLICATIONS

GPD Optoelectronics Corp., GPD Products Overview, Revised Mar. 16, 2015, 5 pages.
OSI Optoelectronics, Photoconductive Series, Version 4, Rev. Oct. 12, 2015, 12 pages.
Cody, "Understanding duplex and single row fiber polarity," *Telecommunications Industry Association 42.11 Meeting*, Project No. TIA-PN-5040, Quebec City, Canada, Jun. 9, 2015, 26 pages.
Extended European Search Report, dated Jan. 16, 2017, for European Application No. 16185019.3-1874, 10 pages.
Fluke Networks, "MultiFiber™ Pro: Optical Power Meter and Fiber Test Kits," URL=http://www.flukenetworks.com/MultiFiberPro/, download date Jul. 10, 2015, 4 pages.
Kingfisher International, "Large Area Detector Optical Power Meter," URL=http://www.kingfisherfiber.com/Fiber-Optic-Test-Equipment/KI2600-Optical-Power-Meter/, download date Jul. 10, 2015, 3 pages.
Lutz, "Maintaining fiber-optic polarity with array cabling," Mar. 1, 2011, URL=http://www.cablinginstall.com/articles/print/volume-19/issue-3/features/maintaining-fiber-optic-polarity-with-array-cabling.html, download date Jan. 3, 2017, 3 pages.
MPO Testing, URL=http://www.psiber.com/en/home/products/cable-tester/mpo-testing.html/, download date Jul. 10, 2015, 1 page.
MultiFiber™ Pro Optical Power Meter and Fiber Test Kits, URL= http://www.flukenetworks.com/datacom-cabling/fiber-testing/multifiber-pro-optical-power/, download date Jul. 10, 2015, 5 pages.
Optotest Corporation, "Integrating Sphere OP-SPHR," URL=http://www.optotest.com/op-sphr-integrating-sphere/, download date Jul. 10, 2015, 2 pages.
OSI Optoelectronics, "Segmented Photodiodes (SPOT Series)," URL=http://www.osioptoelectronics.com/, download date Jul. 10, 2015, 5 pages.
Zubia et al., "Design and Development of a Low-Cost Optical Current Sensor," *Sensors* 13(10):13584-13595, 2013.
Extended European Search Report, dated Oct. 26, 2018, for EP Application No. 18173493.0-1001, 10 pages.

* cited by examiner

MEASURING OPTICAL ARRAY POLARITY, POWER, AND LOSS USING A POSITION SENSING DETECTOR AND PHOTODETECTOR-EQUIPPED OPTICAL TESTING DEVICE

BACKGROUND

Technical Field

This application is directed to an optical testing device for determining optical array polarity and optical signal intensity or loss, and in particular, to an optical testing device that is equipped with both a position sensing detector and a photodetector.

Description of the Related Art

Optical testing devices are becoming increasingly versatile and equipped with wide-ranging functionality. The increasing versatility is the result of the increasing number of varieties of optical fibers, connectors and cables that are sought to be tested. The wide-ranging functionality of optical testing devices improves the user experience and enables users, such as data center technicians, to forgo a multitude of testing devices in favor of one multifaceted and multifunctional testing device.

It is desirable to have an optical testing device that can determine optical array polarity and measure optical signal intensity and/or loss. It is also desirable for the optical testing device to rate both singlemode and multimode optical fiber for optical intensity and/or loss and their respective optical transmission wavelengths.

BRIEF SUMMARY

In an embodiment, an optical testing device includes a position sensing detector having an optical sensing area of a first material that is photosensitive to a first range of wavelengths. In an embodiment, the position sensing detector is configured to receive a plurality of first optical signals emitted through a respective plurality of optical fibers of an optical fiber cable, where the plurality of first optical signals have wavelengths within the first range of wavelengths. In an embodiment, the position sensing detector is configured to detect a plurality of positions where the plurality of first optical signals respectively impinge on the optical sensing area, detect a plurality of first optical intensities of the plurality of first optical signals, respectively, output data representative of the plurality of positions and the plurality of first optical intensities. In an embodiment, the optical testing device includes a photodetector of a second material that is different than the first material and is photosensitive to a second range of wavelengths different than the first range of wavelengths. In an embodiment, the photodetector is configured to receive a plurality of second optical signals emitted through the plurality of optical fibers of the optical fiber cable, respectively, where the plurality of second optical signals having wavelengths within the second range of wavelengths.

In an embodiment, the photodetector is configured to detect a plurality of second optical intensities of the plurality of second optical signals, respectively, output data representative of the plurality of second optical intensities. In an embodiment, the optical testing device includes a processor configured to receive the data representative of the plurality of positions, the data representative of the plurality of first optical intensities, and the data representative of the plurality of second optical intensities, determine a polarity of the optical fiber cable based on the data representative of the plurality of positions, determine an optical loss of at least one first optical signal based on a first optical intensity of the plurality of first optical intensities, determine an optical loss of at least one second optical signal based on a second optical intensity of the plurality of second optical intensities, and output the determined polarity of the optical fiber cable, the optical loss of the at least one first optical signal, and the optical loss of the at least one second optical signal.

In an embodiment, the position sensing detector and the photodetector are stacked such that at least a portion of the position sensing detector overlaps with the photodetector at least a portion of a sensory field of the photodetector. In an embodiment, the position sensing detector is configured to pass light having wavelengths outside of the first range of wavelengths. In an embodiment, the wavelength of the plurality of second optical signals is outside the first range of wavelengths and the photodetector is configured to receive the plurality of second optical signals after the plurality of second optical signals pass through the position sensing detector.

In an embodiment, the position sensing detector is positioned in the optical testing device such that the position sensing detector does not cover any portion of a sensory field of the photodetector. In an embodiment, the optical testing device includes a wavelength-selective optical splitter positioned to receive the plurality of first optical signals and the plurality of second optical signals. In an embodiment, the wavelength-selective optical splitter is configured to selectively output the plurality of first optical signals having wavelengths within the first range of wavelengths to the position sensing detector, and selectively output the plurality of second optical signals having a wavelength within the second range of wavelengths to the photodetector.

In an embodiment, the first material is silicon and the second material is germanium or indium gallium arsenide. In an embodiment, the first range of wavelengths is 350 to 1000 nm and the second range of wavelengths is 700 to 1600 nm. In an embodiment, the plurality of optical fibers are singlemode optical fibers or multimode optical fibers. In an embodiment, the processor configured to receive information indicating an order in which the plurality of first optical signals were received by the position sensing detector, and determine the polarity of the optical fiber cable based on: the information indicating the order in which the plurality of first optical signals were received, information indicating an order in which the plurality of first optical signals were emitted through the plurality of optical fibers, and the data representative of the plurality of positions.

In an embodiment, the position sensing detector is configured to detect a respective plurality of signatures of the plurality of first optical signals and output data representative of the respective plurality of signatures. In an embodiment, the processor is configured to receive the data representative of the respective plurality of signatures, determine a plurality of transmitting positions of the plurality of first optical signals based on the data representative of the respective plurality of signatures, determine the polarity of the optical fiber cable based on the plurality of transmitting positions, and the data representative of the plurality of positions where the plurality of first optical signals respectively impinge on the optical sensing area of the position sensing detector.

In an embodiment, the position sensing detector and the photodetector are stacked with a bonding agent therebetween. In an embodiment, the position sensing detector is coated with a reflective coating configured to pass light having wavelengths within the first range of wavelengths and reflect light having wavelengths outside of the first range of wavelengths and within the second range of wavelengths. In an embodiment, the photodetector is positioned to receive the light reflected by the reflective coating.

In an embodiment, an optical testing device includes a position sensing detector having an optical sensing area of a first material that is photosensitive to a first range of wavelengths. In an embodiment, the position sensing detector is configured to receive a plurality of first optical signals emitted through a respective plurality of optical fibers of an optical fiber cable, where the plurality of first optical signals have wavelengths within the first range of wavelengths. In an embodiment, the position sensing detector is configured to detect a plurality of positions where the plurality of first optical signals respectively impinged on the optical sensing area, and output data representative of the plurality of positions.

In an embodiment, the optical testing device includes a photodetector of a second material that is different than the first material and is photosensitive to a second range of wavelengths different than the first range of wavelengths. In an embodiment, the photodetector is configured to receive a plurality of second optical signals emitted through the plurality of optical fibers of the optical fiber cable, respectively, where the plurality of second optical signals have wavelengths within the second range of wavelengths. In an embodiment, the photodetector is configured to receive a plurality of third optical signals emitted through the plurality of optical fibers of the optical fiber cable, respectively, where the plurality of third optical signals have wavelengths within the second range of wavelengths and different than wavelengths of the plurality of second optical signals. In an embodiment, the photodetector is configured to detect a plurality of first intensities of the plurality of second optical signals, respectively, detect a plurality of second intensities of the plurality of third optical signals, respectively, output data representative of the plurality of first intensities and data representative of the plurality of second intensities.

In an embodiment, the optical testing device includes a processor configured to receive the data representative of the plurality of positions, the data representative of the plurality of first intensities, and the data representative of the plurality of second intensities, determine a polarity of the optical fiber cable based at least in part on the data representative of the plurality of positions, determine an optical loss of at least one second optical signal of the plurality of second optical signals based on a corresponding first intensity of the plurality of first intensities, determine an optical loss of at least one third optical signal of the plurality of third optical signals based on a corresponding second intensity of the plurality of second intensities and output the determined polarity of the optical fiber cable, the optical loss of the at least one second optical signal, and the optical loss of the at least one third optical signal.

In an embodiment, the position sensing detector and the photodetector are stacked with a bonding agent therebetween. In an embodiment, the position sensing detector is coated with a reflective coating configured to pass light having wavelengths within the first range of wavelengths and reflect light having wavelengths outside of the first range of wavelengths and within the second range of wavelengths. In an embodiment, the photodetector is positioned to receive the light reflected by the reflective coating.

In an embodiment, an optical testing device includes an image sensor that is optically responsive to a first range of wavelengths including at least a portion of the visible light spectrum. In an embodiment, the image sensor is configured to receive a plurality of first optical signals emitted through a respective plurality of optical fibers of an optical fiber cable, where the plurality of first optical signals have wavelengths within the first range of wavelengths, detect a plurality of positions where the plurality of first optical signals respectively impinge on the image sensor, and output data representative of the plurality of positions. In an embodiment, an optical testing device includes a photodetector that is optically responsive to a second range of wavelengths different than the first range of wavelengths. In an embodiment, the photodetector is configured to receive a plurality of second optical signals emitted through the plurality of optical fibers, respectively, where the plurality of optical signals have wavelengths within the second range of wavelengths, detect a plurality of optical intensities of the plurality of second optical signals, respectively, and output data representative of the plurality of optical intensities.

In an embodiment, the optical testing device includes a processor configured to receive the data representative of the plurality of positions and the data representative of the plurality of optical intensities, determine a polarity of the optical fiber cable based on the data representative of the plurality of positions, and determine a respective plurality of optical losses or optical intensities based on the plurality of optical intensities of the plurality of second optical signals. In an embodiment, the first range of wavelengths includes at least the portion of the visible light spectrum and an optical range that lies between an end of the visible light spectrum and 1000 nm.

DETAILED DESCRIPTION

Figure 1:
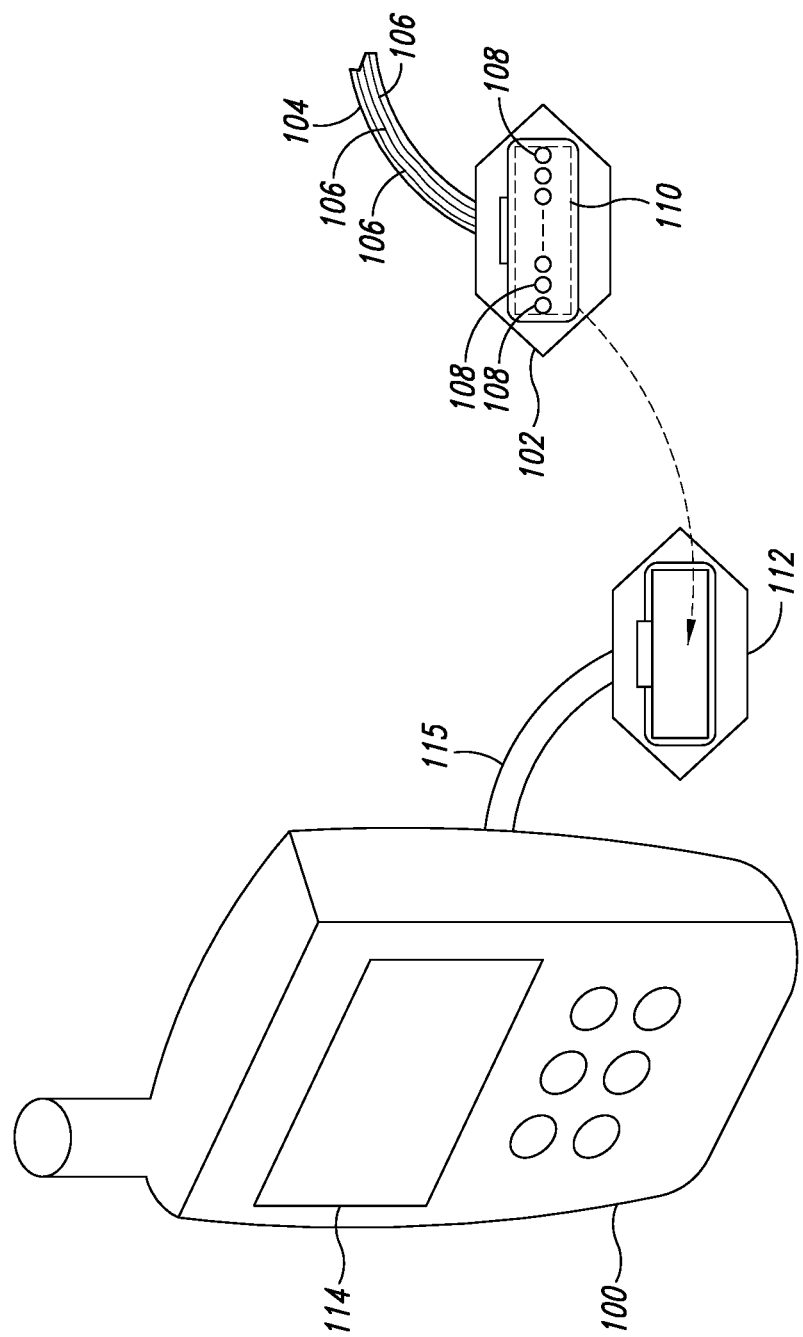
FIG. 1 illustrates an embodiment of an optical testing device that is coupleable to an optical connector of an optical fiber cable.

FIG. 1 illustrates at least one embodiment of an optical testing device 100 that is coupleable to an optical connector 102 of an optical fiber cable 104. The optical fiber cable 104 includes a plurality of optical fibers 106 that are terminated at the cable optical connector 102. A respective plurality of end faces 108 of the plurality of optical fibers 106 form an optical fiber array 110 at the cable optical connector 102.

The optical testing device 100 includes a device optical connector 112 and an interface 114. Although the device optical connector 112 is connected to the optical testing device 100 using a device optical cable 115 as shown in FIG. 1, use of the device optical cable 115 is not necessary. The device optical connector 112 may be disposed on a housing of the optical testing device 100. For example, the device optical connector 112 may be disposed on the front or the back of the optical testing device 100.

The device optical connector 112 is coupleable to the cable optical connector 102. When the device optical connector 112 is coupled to the cable optical connector 102, optical signals emitted through the plurality of optical fibers 106 are received by the optical testing device 100. The optical testing device 100 tests the optical signals to determine a polarity of the optical fiber array 110.

Furthermore, the optical testing device 100 may be used to determine an intensity of an optical signal emanating from an optical fiber 106. The intensity may reflect a strength or power of the optical signal. The intensity may also be used to measure a loss associated with the optical signal as it traverses the optical fiber 106. The optical signal may encounter a loss of strength or power due to, for example, imperfections in the optical fiber 106 or dust particles on the end face of the optical fiber 106. The loss may be calculated based at least in part on the difference between an intensity of the optical signal transmitted into the optical fiber 106 and an intensity of the optical signal received by the optical testing device 100.

An optical fiber 106 of the optical fiber cable 104 (or optical fiber cable 104 itself) may be a singlemode optical fiber or a multimode optical fiber. A singlemode optical fiber may carry traversing light with a lower amount of reflection and refraction than multimode optical fiber. Consequently, multimode optical fiber is associated with greater multipath effect than singlemode optical fiber and results in spreading the pulse of optical signals. The mitigation of the multipath effect and pulse spreading in the singlemode optical fiber allows for use of longer transmission wavelengths than in multimode optical fiber.

Multimode optical fiber may carry optical signals having wavelengths of 850 nanometers (nm) or 1300 nm, among others. A singlemode optical fiber may carry optical signals having longer wavelengths than the multimode optical fiber. For example, a singlemode optical fiber may carry optical signals having wavelengths of 1310 or 1550 nm, among others. The optical testing device 100 may test the optical intensity and loss of both singlemode and multimode wavelengths. The optical testing device 100 may test an optical fiber 106 for a broad range of optical signal wavelengths.

The interface 114 of the optical testing device 100 may be used to provide the results of tests or measurements performed by the optical testing device 100 to the user. The interface 114 is shown to be a screen in FIG. 1 but in various embodiments the interface 114 may be a speaker or a light emitting diode (LED) panel, among others. Furthermore, the interface 114 may include a wireless or wired modem that transmits the test or measurement results to another device, such as a computer, tablet, smartphone or server, among others, to display the results of the tests or measurements to users, such as personnel performing tests on the optical fiber cable 104, or store the results.

It is noted that the optical testing device 100 may be used to emit the optical signals through the optical fibers 106 for testing the optical fibers 106. For example, the optical testing device 100 may include a second device optical connector that may be coupled to a transmitting end (not shown) of the optical fiber cable 104. Alternatively, another device may be used to emit the optical signals through the optical fibers 106.

Figure 2:
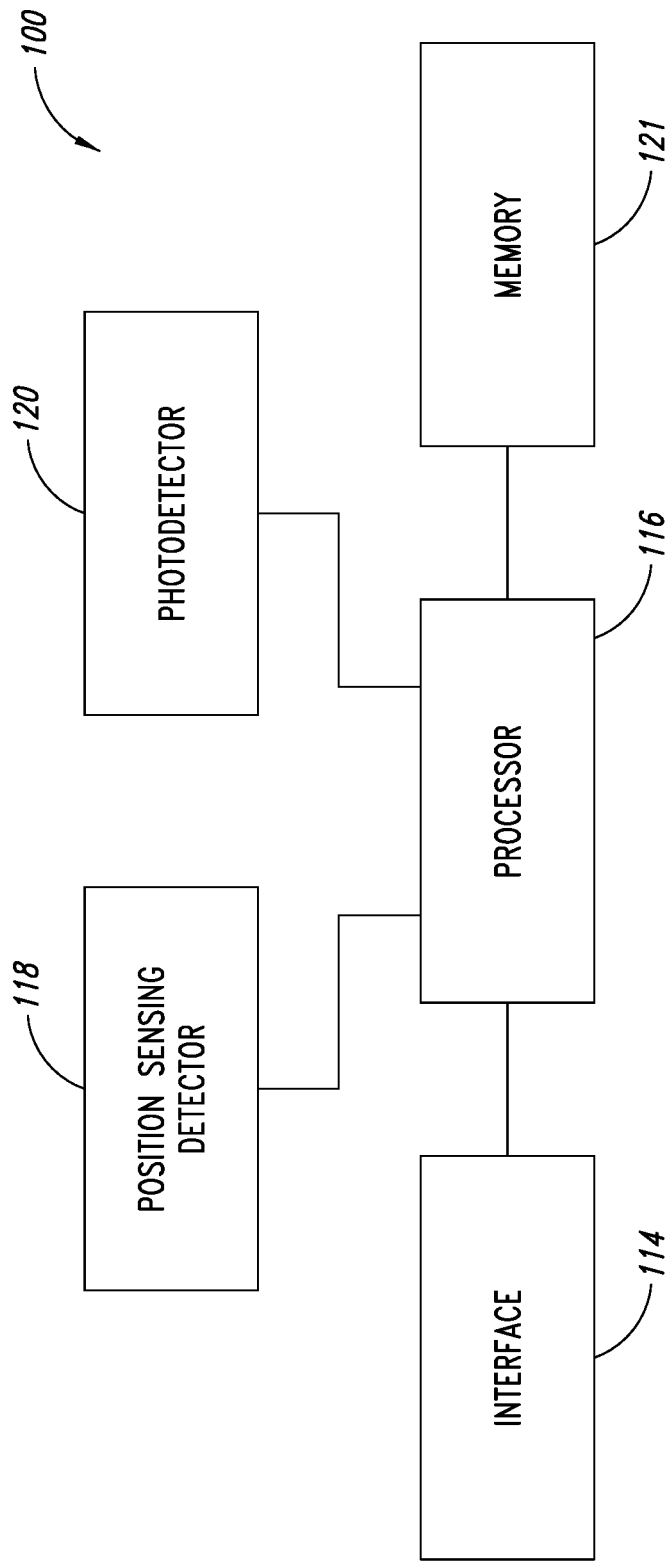
FIG. 2 shows a block diagram of the optical testing device in accordance with an embodiment.

FIG. 2 shows a block diagram of the optical testing device 100 in accordance with an embodiment. The optical testing device 100 includes a processor 116, a position sensing detector 118, a photodetector 120, the interface 114 and a memory 121. The position sensing detector 118, photodetector 120, interface 114 and memory 121 are communicatively coupled to the processor 116.

The position sensing detector 118 may be any type of device that has an optical sensing area for receiving an optical signal that impinges on the optical sensing area. The position sensing detector 118 may output data representative of the position where the optical signal impinged on the optical sensing area. The position sensing detector 118 may also output data representative of an intensity of the optical signal. Examples of the position sensing detector include the OSI Optoelectronics Photoconductive Planar Diffused Silicon Photodiode whose specification sheet is incorporated by reference herein. U.S. Pat. No. 9,518,892, incorporated by reference herein, discloses use of a position sensing detector, such as the position sensing detector 118, for determining optical signal loss and intensity and also determining optical fiber array polarity. The position sensing detector 118 may have an optical sensing area of any size. The optical sensing area may be made of a material such as silicon (Si) and as such may be produced in a cost-effective manner.

A silicon optical sensing area may have a high degree of responsivity for a first range of wavelengths. The first range of wavelengths may be between 350 and 1000 nm or 500 and 1000 nm. Some optical signals emitted through multimode optical fibers may fall within the first range of wavelengths. For example, optical signals having wavelengths of 650 nm and 850 nm that are emitted through multimode optical fiber may be captured by the position sensing detector 118.

Wavelengths outside of the above-referenced first range of wavelengths (for example, within a second range of wavelengths longer than the first range) experience minimal absorption by a silicon position sensing detector 118. The silicon position sensing detector 118 passes through optical signals having wavelengths within the second range. If the silicon position sensing detector 118 does not have a backing, the optical signals may be received by a device, such as photodetector 120, stacked behind the silicon position sensing detector 118 or axially aligned with the silicon position sensing detector 118.

The high degree of responsivity or photosensitivity may be attained if the optical sensing area has a responsivity of 0.2 amperes per watt (A/W) or higher for light of a certain wavelength. A responsivity of 0.2 A/W or higher allows for reliably detecting optical signals. If the responsivity is below 0.2 A/W, the position sensing detector may not reliably capture optical signals that impinge on the optical sensing area, and, accordingly, the optical signals may not be reliably detected.

The photodetector 120 may be any type of device that is capable of receiving an optical signal and outputting data representative of an optical intensity of the optical signal. For example, the photodetector 120 may be a photodiode. The photodetector may be photosensitive to a second range of wavelengths that is different than the first range of wavelengths sensed by the position sensing detector 118.

For example, the photodetector 120 may be made of germanium (Ge) or indium gallium arsenide (InGaAs) and may be photo responsive for wavelengths between 700 and 1600 nm. As such, the photodetector 120 may be capable of detecting the optical intensity of optical signals transmitted through multimode optical fiber, such as optical signals having wavelengths of 850 nm and 1300 nm, as well as optical signals transmitted through singlemode optical fiber, such as optical signals having wavelengths of 1310 nm and 1550 nm.

The memory 121 may be a non-transitory computer-readable storage medium. The memory 121 may be, for example, random access memory (RAM) or read-only memory (ROM), among others, and the memory 121 may be static or dynamic. The memory 121 may be configured to store executable instructions that, when executed by the processor 116, cause the processor 116 to operate as described herein. For instance, the memory 121 may be configured to store executable instructions that, when executed by the processor 116, cause the processor 116 to receive data from the position sensing detector 118 or the photodetector 120, determine an optical power or loss or a polarity based on the data and output data representative of the determined optical power or loss or polarity.

The processor 116 may be any type of device that is equipped with a processing unit, such as a central processing unit (CPU). For example, the processor 116 may be a microcontroller or a controller. The processor 116 may retrieve or receive instructions stored in the memory 121, execute the instructions, and as a result, operate as described herein.

The processor 116 receives from the position sensing detector 118 data representative of a position where an optical signal impinged on the optical sensing area. The processor 116 determines, based on the data representative of the position, a polarity of the optical fiber cable 104 or optical fiber array 110 thereof as described herein.

Further, the processor 116 receives from the position sensing detector 118 or the photodetector 120 data representative of the intensity of the optical signal. The processor 116 determines, based on data representative of the intensity of the optical signal, an optical loss associated with the optical signal.

Because the position sensing detector 118 is optically responsive to the first range of wavelengths described above, the processor 116, and consequently the optical testing device 100, utilizes the data received from the position sensing detector 118 to determine optical loss or optical power or intensity for wavelengths within the first range of wavelengths.

Further, because the photodetector 120 is optically responsive to the second range of wavelengths described above, the processor 116 (or the optical testing device 100) utilizes the data received from the photodetector 116 to determine optical loss or optical power or intensity for wavelengths within the second range of wavelengths.

Accordingly, use of the position sensing detector 118 and the photodetector 120 allows for determining the optical loss for the optical fibers 106 for various optical transmission wavelengths in both the first range of wavelengths and the second range of wavelengths covering transmission wavelengths for both singlemode and multimode optical fibers. At the same time the polarity of the optical fiber array 110 may be determined based on data output by the position sensing detector 118 for wavelengths within the first range of wavelengths.

The optical testing device 100 may also be cost-effectively produced. Silicon position sensing detectors, which are both reliably responsive to the first range of wavelengths and have position sensing capability, are more economically feasible than other position sensing detectors which are reliably responsive to higher wavelengths within the second range of wavelengths. The optical testing device 100 uses the position sensing capabilities of the position sensing detector to detect polarity of optical signals within the first range of wavelengths. If needed, the optical testing device 100 uses the intensity detection capabilities of the position sensing detector to detect intensity or loss of optical signals within the first range of wavelengths.

For detecting the intensity or loss of optical signals within the second range of wavelengths, the optical testing device 100 uses the photodetector 120. Unlike their position sensing detector counterparts, germanium or InGaAs photodetectors, which are responsive to the second range of wavelengths, are economically feasible. The optical testing device 100 uses a germanium or InGaAs photodetector for detecting intensity or loss of optical signals within the second range of wavelengths.

Accordingly, the commercial feasibility of the optical testing device 100 is improved by incorporating the photodetector 120 and shifting intensity or loss of detection of optical signals within the second range of wavelengths to the photodetector 120. Doing so allows for using a silicon position sensing detector instead of a more expensive germanium or InGaAs position sensing detector for polarity measurement. In the aggregate, the cost and commercial feasibility of the optical testing device 100 is substantially improved.

Figure 3:
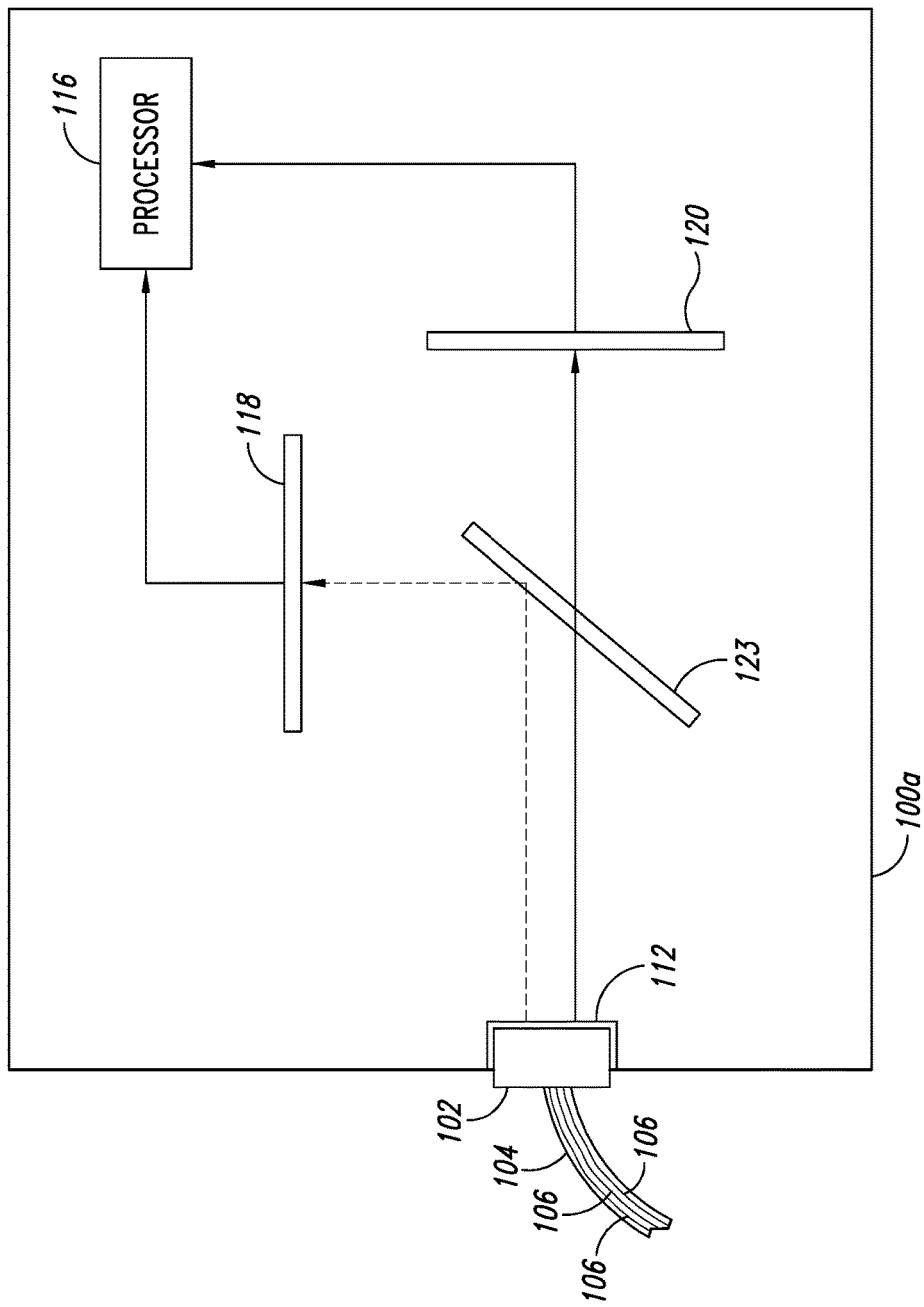
FIG. 3 shows an optical testing device connected to an optical fiber cable in accordance with an embodiment.

FIG. 3 shows an optical testing device 100a connected to an optical fiber cable 104 in accordance with an embodiment. Similar elements of the optical testing device 100a as those of the optical testing device 100 described with reference to FIG. 2 have the same reference numerals. The optical testing device 100a includes the processor 116, the position sensing detector 118, the photodetector 120, an optical splitter 123 and the device optical connector 112. The optical fiber cable 104 includes the plurality of optical fibers 106. One end of the optical fiber cable 104 is terminated at the cable optical connector 102. The cable optical connector 102 is connected to the optical connector 112 of the optical testing device 100a. Optical signals that are emitted by the plurality of optical fibers 106 of the optical fiber cable 104 are evaluated by the optical testing device 100a to determine an optical loss associated with the optical fibers 106, a power of the optical signals, and/or a polarity of the optical fiber cable 104, the connector 102 thereof or the optical fiber array 110 thereof.

The optical splitter 123 may be any type of wavelength-selective device that is configured to receive an optical signal and output the optical signal to the position sensing detector 118 or the photodetector 120. The optical splitter 123 may, for example, be a beam splitter. The optical splitter 123 may selectively output the optical signal to the position sensing detector 118 or the photodetector 120. The optical splitter 123 may selectively output the optical signal by directing the optical signal to either device or guiding the optical signal in a direction of either device. The optical splitter 123 may output the optical signal by reflecting or refracting the optical signal. The direction in which the optical splitter 123 outputs the optical signal may be based on (for example, a function of) a wavelength of the optical signal.

As shown in FIG. 3, the optical splitter 123 may be positioned in the optical testing device 100a such that optical signals emanating from the optical fibers 106 of the optical fiber cable 104 impinge on the optical splitter 123 when the cable optical connector 102 is connected to the device optical connector 112. The position sensing detector 118 may be positioned in relation to the optical splitter 123 in a direction in which optical signals having wavelengths within the first range of wavelengths (described above) are output. Further, the photodetector 120 may be positioned in relation to the optical splitter 123 in a direction in which optical signals having wavelengths within the second range of wavelengths (described above) are output.

As shown in FIG. 3, the optical splitter 123 reflects optical signals having wavelengths within the first range of wavelengths and refracts optical signals having wavelengths within the second range of wavelengths. The photodetector 120 and the optical splitter 123 are positioned on a first optical axis. The photodetector 120 receives the optical signals refracted by the optical splitter 123. The position sensing detector 118 and the optical splitter 123 are positioned on a second optical axis transverse to the first optical axis. The position sensing detector 118 receives optical signals reflected by the optical splitter 123. The position sensing detector 118 is positioned so that it does not cover or block a sensory field of the photodetector 120 and vice-versa.

It is noted that in various embodiments, the optical testing device 100a may include one or more lenses that focus optical signals. For example, a lens may be positioned to focus optical signals that impinge on the optical splitter 123. Alternatively or in addition, a lens may be positioned in a sensory field of the position sensing detector 118 or the photodetector 120. The lens may focus optical signals output by the optical splitter 123. In the event that the sensory field of the position sensing detector 118 or the photodetector 120 is not large enough to encompass all optical signals within the first or second ranges of wavelengths, respectively, the lens may focus the optical signals to be within the sensory field.

In an embodiment, a power splitter may be used in place of the wavelength-selective splitter. The power splitter may be a 50%/50% splitter, among others. Whereas the wavelength-selective splitter selectively outputs an optical signal based on the signal's wavelength, the power splitter divides the power of the signal among its various outputs and outputs a reduced-power optical signal to each output.

When the power splitter is used in the optical testing device 100a, both the position sensing detector 118 and the photodetector 120 receive a power-reduced optical signal. Depending on the responsivity of the position sensing detector 118 and the photodetector 120 to the wavelength of the optical signal, one or both of the detectors measures an optical power of the optical signal and outputs data representative of the optical power to the processor 116. The processor 116 receives the data. The processor 116 may be configured with a power reduction parameter associated with the power splitter. For example, if the power splitter is a 50%/50% splitter, the power reduction parameter may be 0.5 or 3 dB. The processor may scale the detected optical power of the optical signal to account for the power reduction of the power splitter. For example, when a 50%/50% splitter is used, the processor 116 may double the detected optical power of the optical signal.

Figure 4:
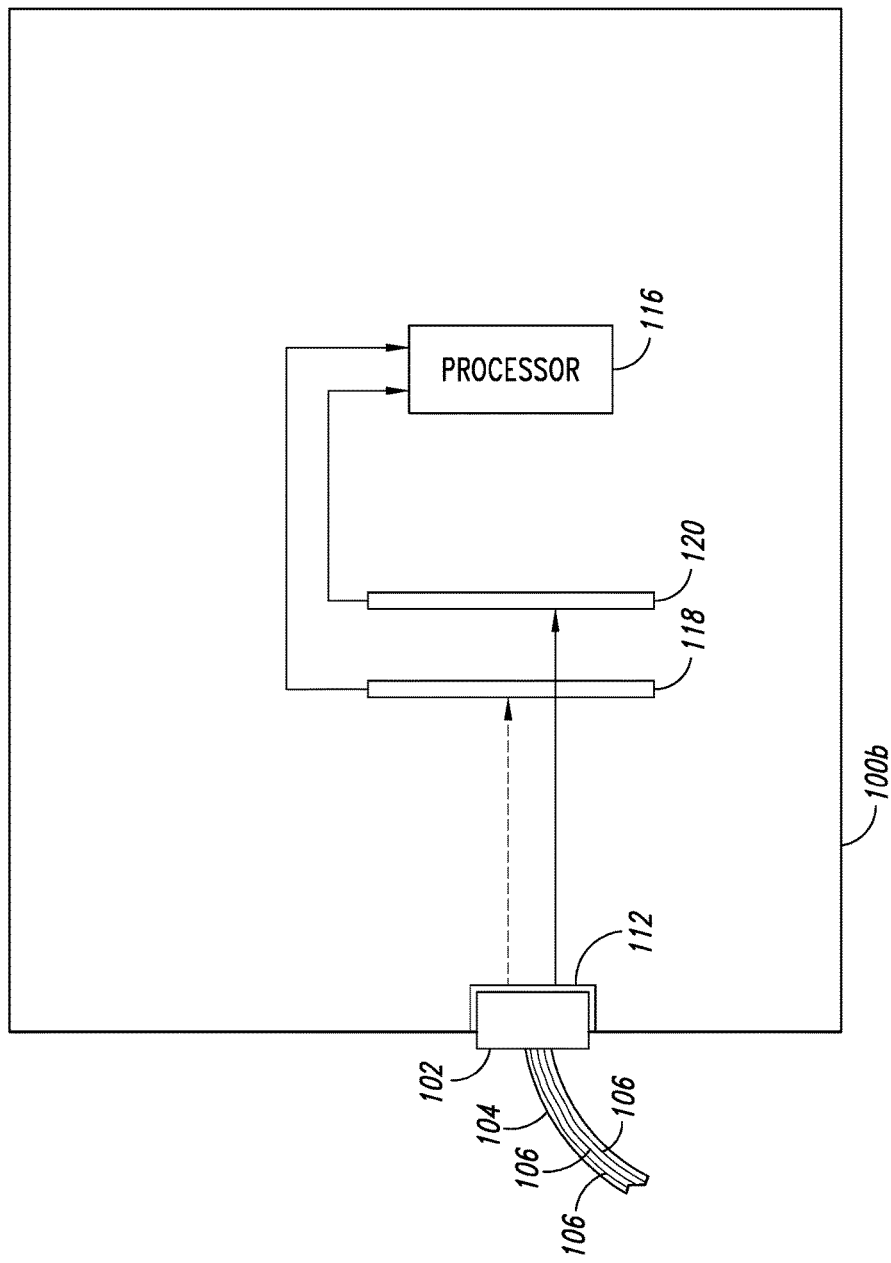
FIG. 4 shows an optical testing device connected to an optical fiber cable in accordance with an embodiment.

FIG. 4 shows an optical testing device 100b connected to an optical fiber cable 104 in accordance with an embodiment. Elements of the optical testing device 100b that are similar to those of the optical testing device 100a described with reference to FIG. 3 have the same reference numerals. Unlike FIG. 3 however, the position sensing detector 118 and the photodetector 120 in FIG. 4 are stacked or overlapped (for example, with a bonding agent therebetween). The position sensing detector 118 may be positioned in a sensory field of the photodetector 120 and may at least partially cover the photodetector 120. Further, the sensory fields of the position sensing detector 118 and the photodetector 120 may be overlapping.

The position sensing detector 118 may be configured to absorb optical signals within a first range of wavelengths (e.g., the first range of wavelengths described above) and optically pass through optical signals outside the first range of wavelengths. The optical signals having wavelengths outside of the first range of wavelengths then impinge on the photodetector 120. In the case of overlap between the first and second ranges of wavelengths, the position sensing detector 118 may pass optical signals within the second range that are outside of the first range. The position sensing detector 118 may absorb some of the power of the optical signals within the second range that are outside of the first range. The passing optical signals then impinge on the photodetector 120. As described herein, the position sensing detector 118 outputs to the processor 116 data representative of an intensity or power of the received optical signals within the first range of wavelengths. Furthermore, the position sensing detector 118 may output data representative of the position at which the optical signals impinged on the position sensing detector 118 for polarity determination. The photodetector 120 outputs to the processor 116 data representative of an intensity or power of the received optical signals within the second range of wavelengths.

Figure 5A:
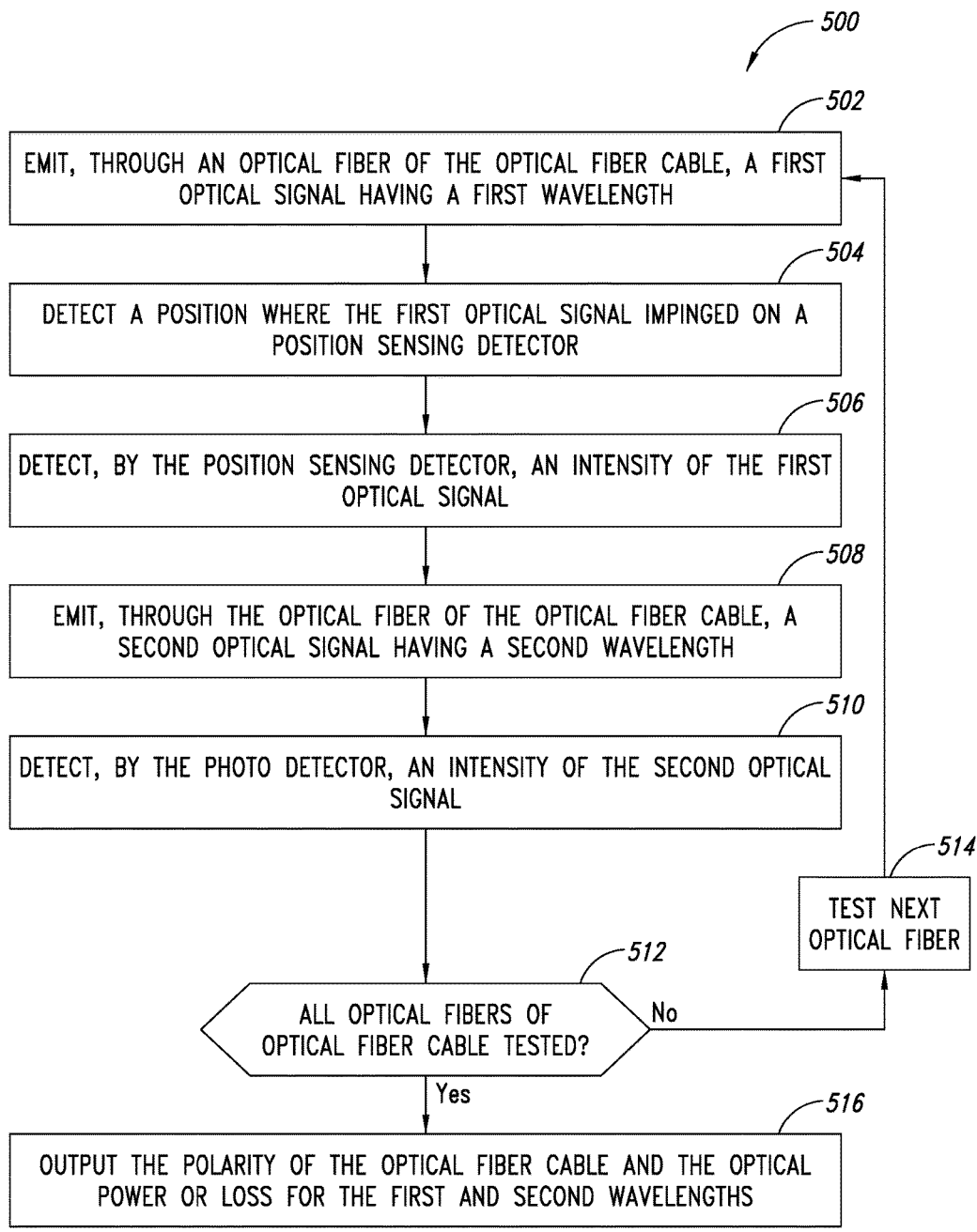
FIG. 5A shows a flow diagram of a method for testing a multimode optical fiber cable.

FIG. 5A shows a flow diagram of a method for testing a multimode optical fiber cable 104. The multimode optical fiber cable 104 may be tested at two multimode transmission wavelengths: a first multimode wavelength and a second multimode wavelength. The first multimode wavelength may, for example, be 850 nm and may, accordingly, be in the first range of wavelengths. The second multimode wavelength may, for example, be 1300 nm and may, accordingly, be outside the first range of wavelengths and in the second range of wavelengths.

In the method 500, an optical testing device, such as the optical testing device 100 described with reference to FIG. 1, at 502 emits, through an optical fiber 106 of the optical fiber cable 104, a first optical signal having the first wavelength.

A position sensing detector, such as the position sensing detector 118 described with reference to FIG. 2, captures the first optical signal. The position sensing detector detects, at 504, a position where the first optical signal impinged on the position sensing detector. The position sensing detector detects, at 506, an intensity of the first optical signal. As described herein, the position sensing detector outputs data representative of the position and the intensity to a processor, such as the processor 116 described with reference to FIG. 1.

After emitting the first optical signal, the optical testing device emits, at 508, the second optical signal through the optical fiber 106 of the optical fiber cable 104. The second optical signal is captured by a photodetector, such as the photodetector 120, described with reference to FIG. 2. At 510, the photodetector detects an intensity of the second optical signal. The photodetector outputs the detected intensity to the processor 116 as described herein.

At 512, the processor 116 then determines whether all of the optical fibers of the optical fiber cable (or optical fiber array 110) have been tested. If a negative determination is made, the optical testing device tests a next optical fiber at 514, whereby steps 502-510 are performed for the next optical fiber.

If a positive determination is made, the processor 116 at 516 outputs the polarity of the optical fiber cable and the optical power or loss for the first and second wavelengths. The polarity is determined based on position information obtained at 504. It is noted that the first wavelength, which may be 850 nm, is used for the dual purpose of determining polarity and testing the optical fiber for the multimode transmission wavelength of 850 nm.

In an embodiment, the optical testing device may include a Visual Fault Locator (VFL), which emits visible light wavelengths, such as 635 nm or 650 nm. The visible light spectrum ranges from 400 nm to 700 nm. The visible light optical signal may be used to determine polarity. However, due to the higher attenuation of shorter wavelengths by optical fiber, there may be a performance advantage by utilizing a non-visible light 850 nm emitter instead.

It is noted that because polarity is independent of optical signal wavelength, the polarity may be determined using a plurality of first optical signals having wavelengths within the range of responsivity of the position sensing detector. A plurality of second optical signals may be used for testing the optical loss of the optical fiber.

In an embodiment, the optical testing device may cycle through the optical fibers of the optical fiber cable to determine the polarity based on position information captured by the position sensing detector for a first wavelength, such as 550 nm, emitted by a Visual Fault Locator. Then the optical testing device may test the optical fibers to determine optical power or loss for a second transmission wavelength, such as 850 nm, based on power or loss information captured by the photodetector. The optical testing device may then test optical power or loss for a third transmission wavelength, such as 1300 nm.

Figure 5B:
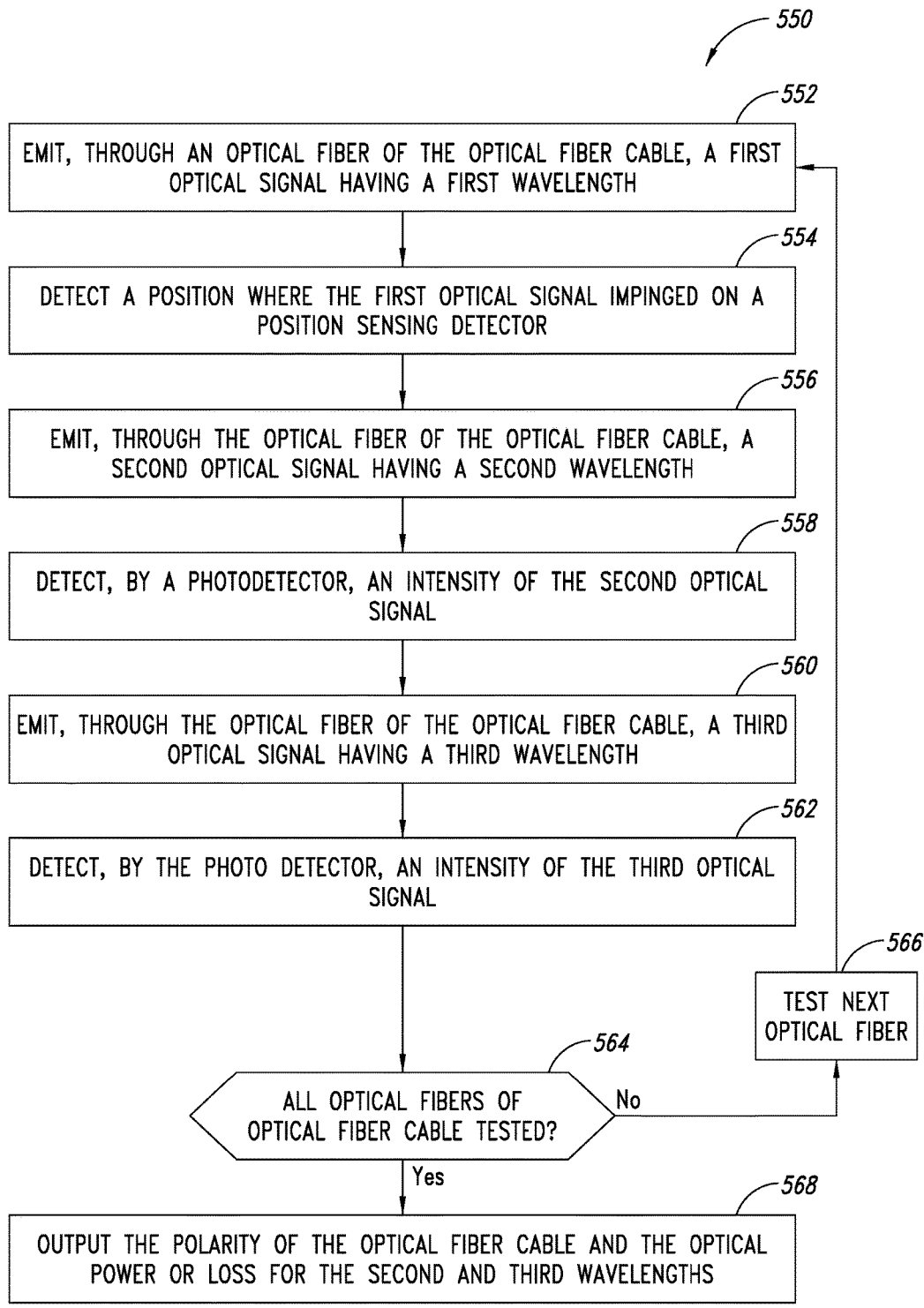
FIG. 5B shows a flow diagram of a method for testing a singlemode optical fiber cable.

FIG. 5B shows a flow diagram of a method 550 for testing a singlemode optical fiber cable 104. The traditional wavelengths for singlemode optical fiber are outside the range of responsivity of a silicon position sensing detector. Therefore, a non-singlemode wavelength is used to determine polarity, whereas optical power or loss is determined for traditional singlemode wavelengths.

In the method 550, an optical testing device, such as the optical testing device 100 described with reference to FIG. 1, at 552 emits, through an optical fiber 106 of the optical fiber cable 104, a first optical signal having a first wavelength. The first wavelength may be a visible light wavelength, such as 635 nm or 650 nm. Further, the first optical signal may be emitted by a Visual Fault Locator of the optical testing device.

A position sensing detector, such as the position sensing detector 118 described with reference to FIG. 2, captures the first optical signal. The position sensing detector detects, at 554, a position where the first optical signal impinged on the position sensing detector. As described herein, the position sensing detector outputs data representative of the position and the intensity to a processor, such as the processor 116 described with reference to FIG. 1.

After emitting the first optical signal, the optical testing device emits, at 556, a second optical signal through the optical fiber 106 of the optical fiber cable 104. The second optical signal may have a traditional singlemode wavelength, such as 1310 nm, within the second range of wavelengths. The second optical signal is captured by a photodetector, such as the photodetector 120, described with reference to FIG. 2. At 558, the photodetector detects an intensity of the second optical signal. The photodetector outputs the detected intensity to the processor 116 as described herein.

At 560, the optical testing device emits a third optical signal through the optical fiber 106 of the optical fiber cable 104. The third optical signal may have a traditional singlemode wavelength, such as 1550 nm, that is within the second range of wavelengths. The third optical signal is captured by a photodetector, such as the photodetector 120, described with reference to FIG. 2. At 562, the photodetector detects an intensity of the third optical signal. The photodetector outputs the detected intensity to the processor 116 as described herein.

At 564, the processor 116 then determines whether all of the optical fibers of the optical fiber cable (or optical fiber array 110) have been tested. If a negative determination is made, the optical testing device tests a next optical fiber at 566, whereby steps 552-562 are performed for the next optical fiber.

If a positive determination is made at 564, the processor 116 at 568 outputs the polarity of the optical fiber cable and the optical power or loss for the second and third wavelengths. The polarity is determined based on position information detected at 554. It is noted that the first optical signal is used for polarity determination of the singlemode optical fiber. The second and third optical signals are used for determining optical power/loss.

Due to the higher attenuation of shorter wavelengths by the optical fiber, there may be a performance advantage in certain embodiments for the optical testing device to include an emitter that emits optical signals at a longer wavelength, such as 850 nm or 950 nm. However, adding the emitter will increase the cost of the optical testing device.

Figure 6:
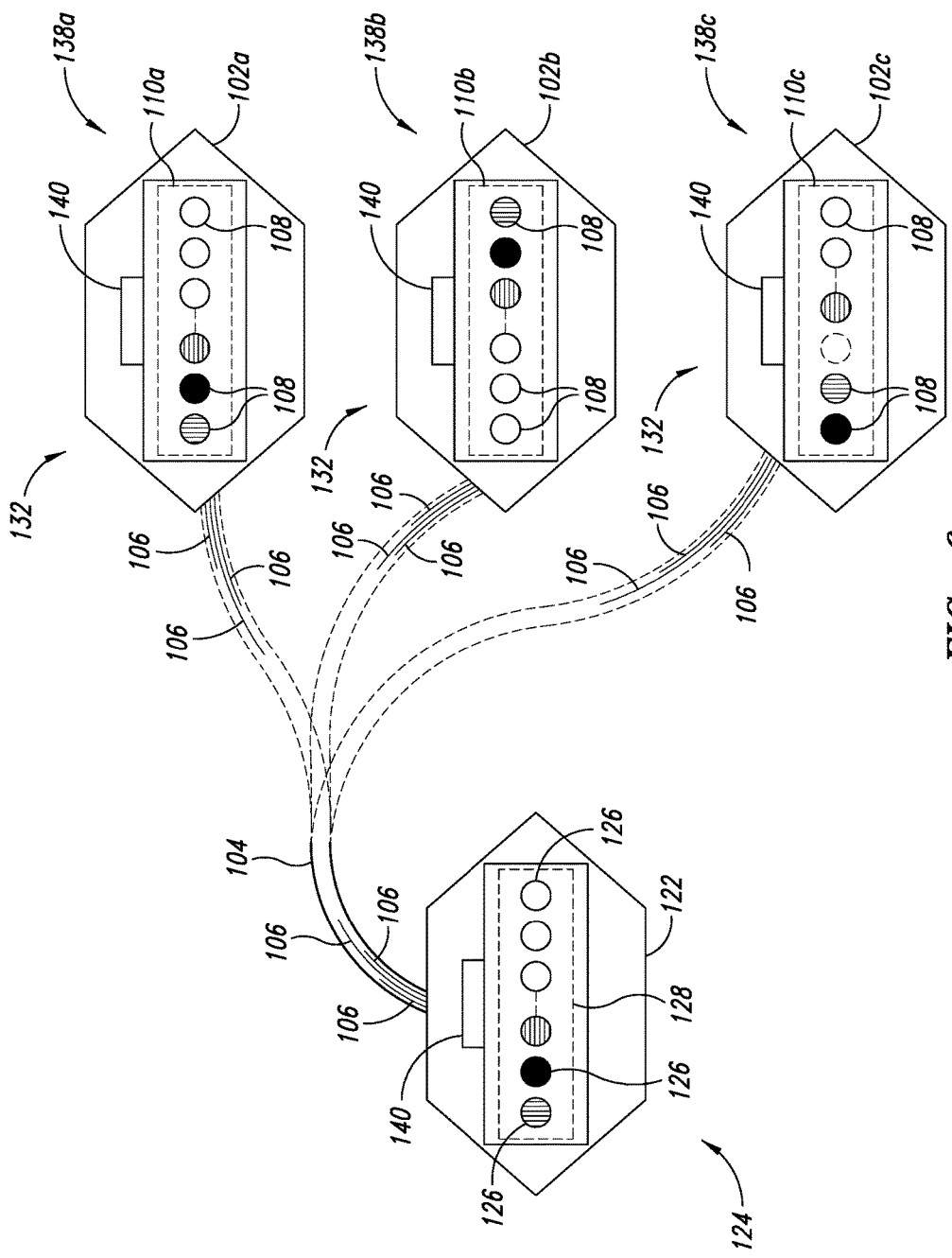
FIG. 6 shows an illustration of optical fiber array polarity.

FIG. 6 shows an illustration of optical fiber array polarity. In FIG. 6, an optical connector 122 of a transmitting end 124 of the optical fiber cable 104 is shown. As described herein, the optical fiber cable 104 includes the plurality of optical fibers 106. The plurality of optical fibers 106 are terminated at the optical connector 122 of the transmitting end 124. A respective plurality of end faces 126 of the plurality of optical fibers 106 form an optical fiber array 128 at the optical connector 122 of the transmitting end 124. Three optical connectors 102a, 102b, 102c of a receiving end 132 of the optical fiber cable 104 according to three polarity types, respectively, are also shown. A respective plurality of end faces 108 of the plurality of optical fibers 106 form optical fiber arrays 110a, 110b, 110c. The optical fiber arrays 110a, 110b, 110c are respectively formed at the optical connectors 102a, 102b, 102c of the receiving end 132. Each optical fiber array 110a, 110b, 110c has a respective polarity.

The polarity of the optical fiber array 110a, 110b, 110c refers to a relationship between a transmitting position in the optical fiber array 128 of the transmitting end 124 and a receiving position in the optical fiber array 110 of the receiving end 132.

A first optical fiber array 110a has a first polarity 138a (known as a "Type A" polarity as defined by the American National Standards Institute/Telecommunications Industry Association 568 specification (ANSI/TIA-568)). According to the first polarity 138a, a receiving position of an optical fiber 106 is the same as a transmitting position of the optical fiber 106. The transmitting and receiving positions may be referenced by a key 140 of the optical connectors 102, 122. For example, a first position may be the leftmost position in relation to the key 140 and a second position may be the second position from the left in relation to the key 140 and so on. Although the optical fiber arrays 110, 128 are shown to include one row of end faces 108, 126 in FIG. 4, it is noted that in other embodiments the optical fiber arrays 110, 128 may have a different arrangement, including an arrangement having more than one row of optical fiber end faces 108, 126.

A second optical fiber array 110*b* has a second polarity 138*b* (known as a "Type B" polarity). According to the second polarity 138*b*, a receiving position of an optical fiber 106 is transposed with respect to a transmitting position. Accordingly, an optical signal that is transmitted into the optical fiber 106 at the leftmost position with respect to the key 140 will be received at the rightmost position with respect to the key 140 on the optical fiber array 110*b* of the receiving end 132. Similarly, an optical signal that is transmitted into an optical fiber at the position that is third from left with respect to the key 140 on the transmitting end will be received at the position that is third from right on the receiving end 132.

A third optical fiber array 110*c* has a third polarity 138*c* (known as a "Type C" polarity). According to the third polarity 138*c*, a receiving position of the optical signal will be pairwise transposed with respect to the transmitting position. Accordingly, an optical signal that is transmitted into the optical fiber 106 at the leftmost position with respect to the key 140 on the transmitting end 124 will be received at the second position from the left with respect to the key 140 at the receiving end 132 and vice-versa. Similarly, an optical signal that is transmitted into the optical fiber 106 at a position that is third from left with respect to the key 140 on the transmitting end 124 will be received at the position that is fourth from the left at the receiving end 132.

Referring back to FIG. 2, data representative of a position on which optical signals impinged on the position sensing detector 118 may be used to determine a receiving position of an optical signal in the optical fiber array 110 of the receiving end 132. Once the receiving position is determined, the polarity of the optical fiber cable 104 or array 110 may be determined by the processor 116 based on the determined receiving position as well as the known transmitting position of the optical signal.

Figure 7:
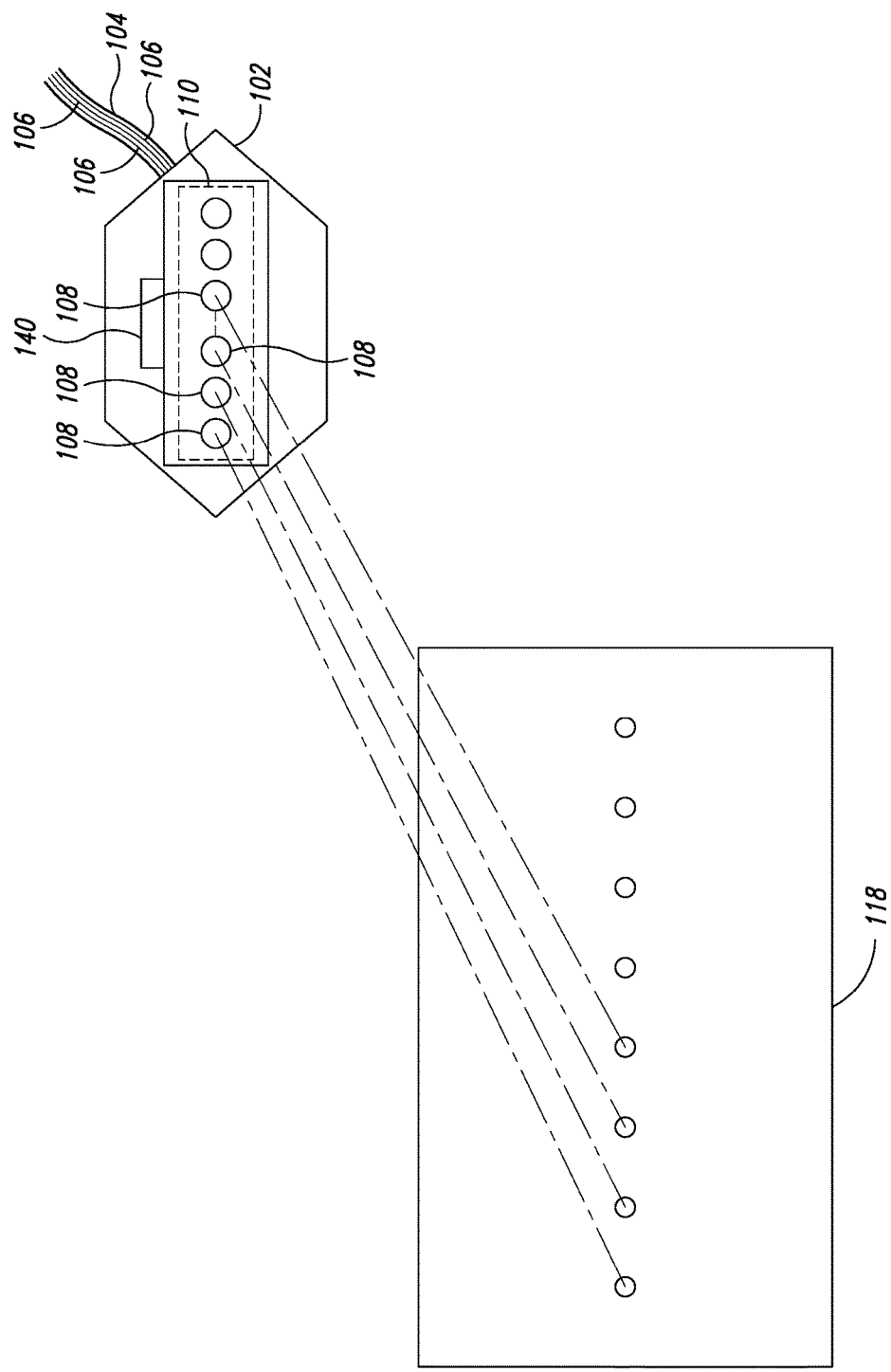
FIG. 7 shows an illustration of the position sensing detector receiving optical signals emanating from the optical fiber array.

FIG. 7 shows an illustration of the position sensing detector 118 receiving optical signals emanating from the optical fiber array 110. It is noted that for ease of description, the effect or use of the optical splitter 123 or a lens is ignored in FIG. 7. The position sensing detector 118 receives the optical signals. The position where an optical signal is received on the position sensing detector 118 corresponds to the position of end face 108 of the optical fiber 106 (through which the optical signal is transmitted) in the optical fiber array 110. The position where the optical signal is received is indicative of the position of end face 108 emitting the optical signal in the optical fiber array 110. The position sensing detector 118 detects the position where optical signals impinged on the position sensing detector 118 and outputs data representative of the position. The data may be output to the processor 116. The processor may use the data to determine the polarity of the optical fiber cable 104 or array 110 thereof.

To determine the plurality of the optical fiber cable 104, a testing convention may be adopted. While testing the optical fiber cable 104, optical signals may be transmitted over the plurality of optical fibers 106 in a particular order. For example, the optical signals may be transmitted over the plurality of optical fibers 106 sequentially from a leftmost transmitting position to a rightmost transmitting position. If the receiving order of the optical fiber signals was determined to be from a leftmost receiving position to a rightmost receiving position, then the polarity of the optical fiber cable 104 may be determined to be the first polarity 138*a* described with reference to FIG. 6. Conversely, if the receiving order was determined to be from a rightmost receiving position to a leftmost receiving position, then the polarity of the optical fiber cable 104 may be determined to be the second polarity 138*b* described with reference to FIG. 6. Alternatively, if the receiving order was determined to be pairwise transposed in relation to the transmitting order, then the polarity of the optical fiber cable 104 may be determined to be the third polarity 138*c* described with reference to FIG. 6.

As an alternative to using the transmitting and receiving order described herein as a testing convention, an optical signal having a unique signature may be transmitted over an optical fiber cable having a particular transmitting position at the transmitting end of the cable. The signature may be based on a modulation of the optical signal or a wavelength associated with the optical signal. For example, the optical signal transmitted over an optical fiber cable having a particular transmitting position may be modulated using a unique on-off keying pattern, among others. Alternatively or in addition, the optical signal transmitted over the optical fiber cable having a particular transmitting position may have a unique wavelength. The signature may be a priori known to the optical testing device 100. The signature of a received optical signal may be detected by the position sensing detector 118 and may be output to the processor 116. For example, an on-off keying pattern of the received optical signal may be identified. The signature may be indicative of the transmitting position. The processor 116 may determine the polarity of the optical fiber cable 104 based on the known transmitting position and the detected receiving position of the optical signal determined based on the detected unique signature of the optical signal.

Figure 8:
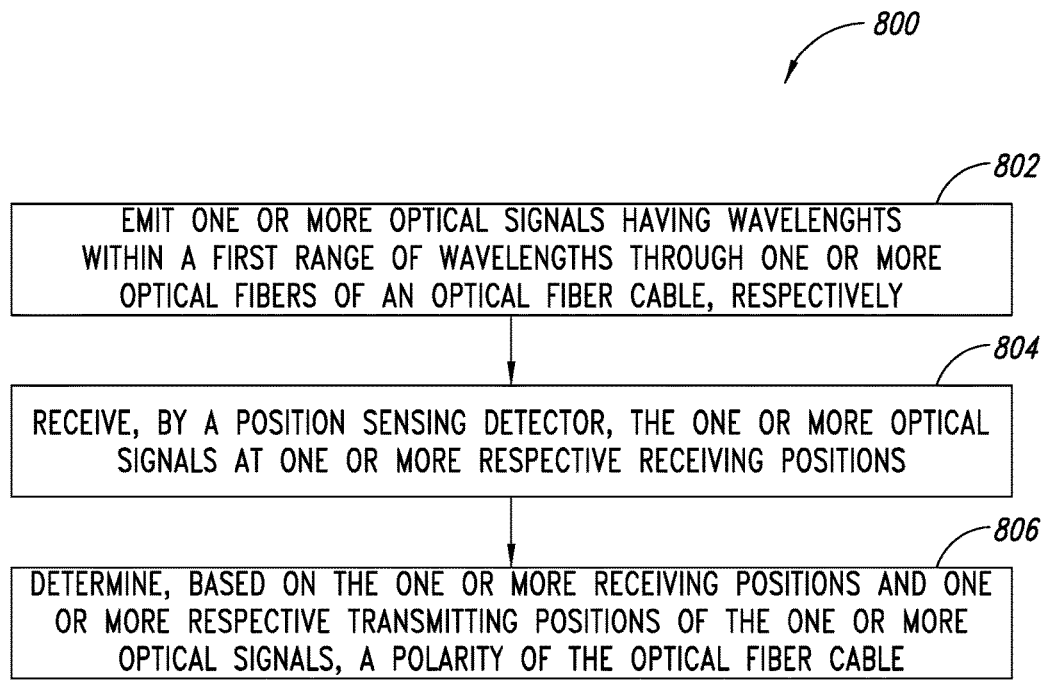
FIG. 8 shows a flow diagram of a method for determining a polarity of an optical fiber array.

FIG. 8 shows a flow diagram of a method 800 for determining a polarity of an optical fiber cable 104. In the method 800, an optical testing device such as the optical testing device 100 described with reference to FIG. 2, emits at 802 one or more optical signals having wavelengths within a first range of wavelengths. The one or more optical signals may be emitted through one or more optical fibers of an optical fiber cable, respectively. As described herein, the one or more optical signals may be emitted through the one or more respective optical fibers in a particular order. The order may be indicative of the transmitting positions of the one or more optical signals. Alternatively or in addition, the one or more optical signals may have unique signatures indicative of their transmitting positions. Because the one or more optical signals having wavelengths within the first range of wavelengths, the one or more optical signals are reliably detectable by the position sensing detector having, for example, a silicon optical sensing area as earlier described.

At 804, a position sensing detector such as the position sensing detector 118 described with reference to FIG. 2, receives the one or more optical signals at one or more respective receiving positions. The position sensing detector may determine the respective receiving positions as described above and output data representative of the one or more receiving positions. The data may be output to a processor, such as the processor 116 described with reference to FIG. 2.

At 806, the optical testing device determines a polarity of the optical fiber cable. As described herein, the polarity of the optical fiber cable may be determined based on the one or more receiving positions and one or more respective transmitting positions of the one or more optical signals.

In an embodiment, the optical splitter of the optical testing device may be replaced with reflective coating. The reflective coating may reflect optical signals having wavelengths within the second range of wavelengths and pass without reflecting optical signals having wavelengths within the first range of wavelengths.

Figure 9:
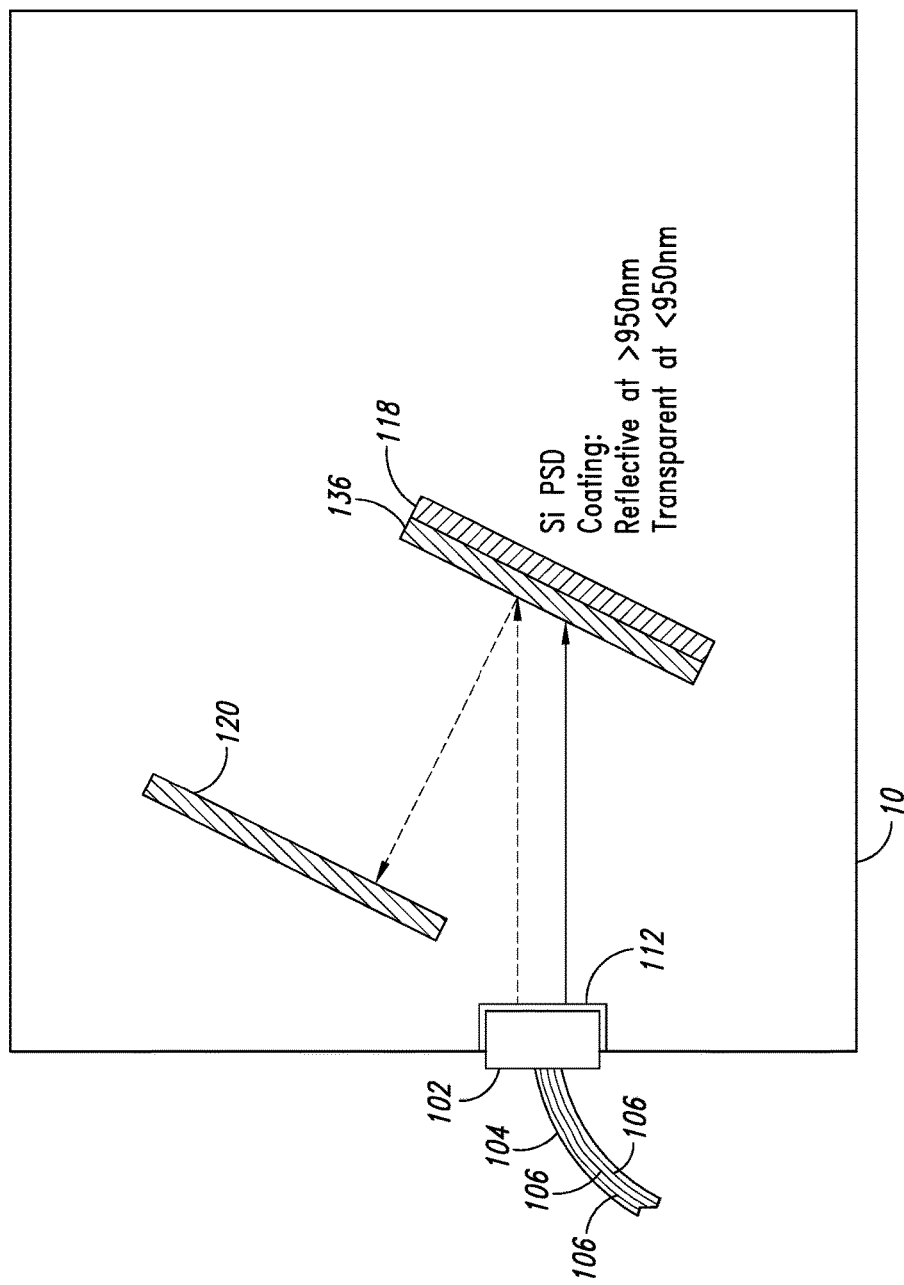
FIG. 9 shows an optical testing device connected to an optical fiber cable in accordance with an embodiment.

FIG. 9 shows an optical testing device 100*c* connected to an optical fiber cable 104 in accordance with an embodiment. Elements of the optical testing device 100*c* that are similar to those of the optical testing device 100*a* described with reference to FIG. 3 have the same reference numerals.

The position sensing detector is coated with a reflective coating 136. The reflective coating may be transparent to and may pass optical signals having wavelengths within the first range of wavelengths (for example, less than 950 nm). The reflective coating may reflect optical signals having wavelengths outside of the first range or within the second range (for example, greater than 950 nm). The position sensing detector 118 and the reflective coating 136 are positioned on a first optical axis. The position sensing detector 118 receives optical signals that pass through the reflective coating 136. The photodetector 120 and the reflective coating 136 are positioned on a second optical axis transverse to the first optical axis. The photodetector 120 receives optical signals reflected by the reflective coating 136.

In an embodiment, the optical testing device 100 may include an image sensor in place of the position sensing detector 118. The image sensor may be used for polarity determination. The image sensor may be capable of determining the position where an optical signal impinged on the image sensor, where the optical signal is a visible light signal having a visible light wavelength or may have a wavelength near the visible light range. The image sensor may be responsive to optical signals as well as near infrared (NIR) signals and short wave infrared (SWIR) signal. For example, the image sensor may be responsive to optical signals between an end of the visible light spectrum and 1000 nm. The image sensor may not be capable of determining the intensity of optical signals within the visible light spectrum.

Figure 10:
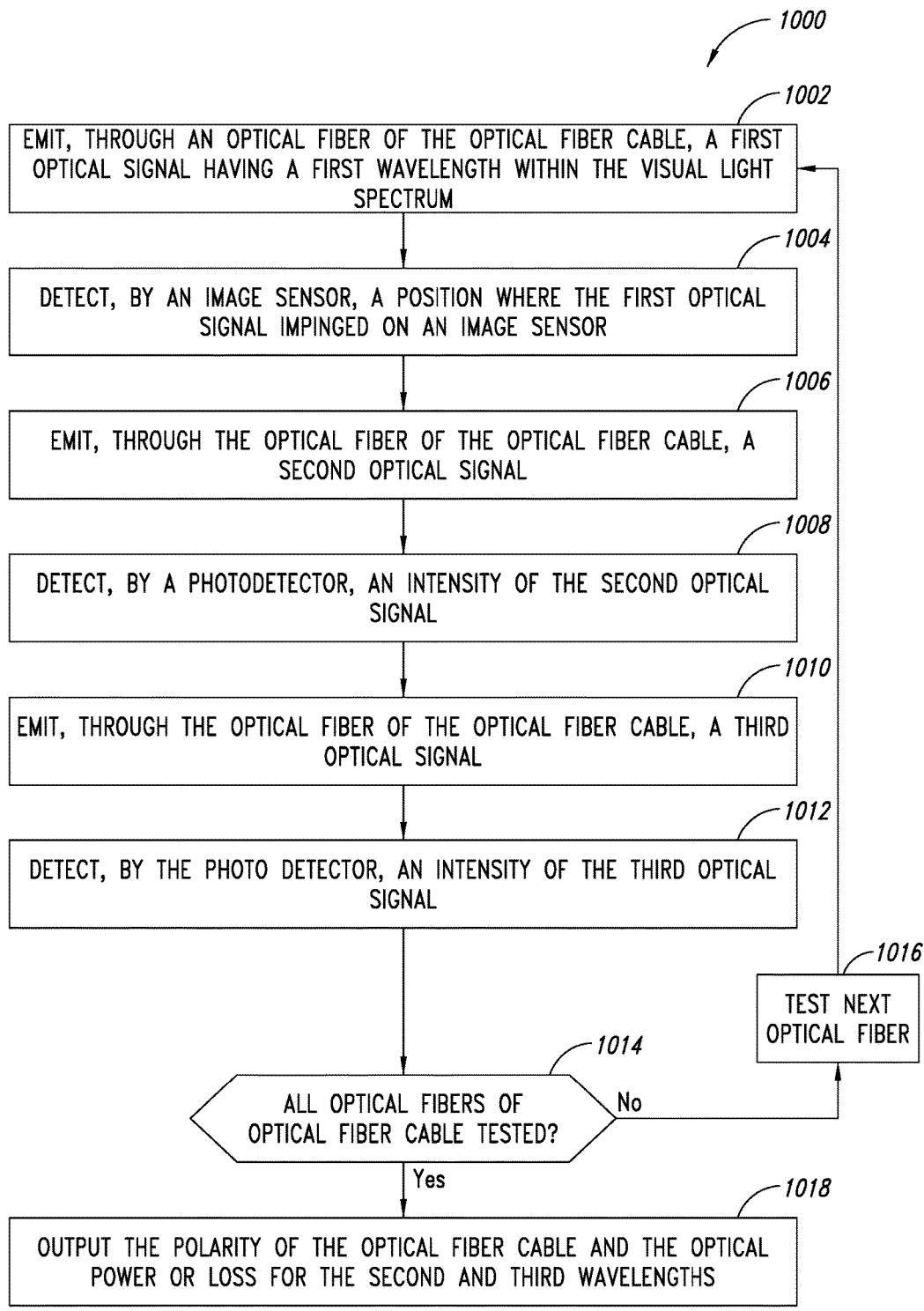
FIG. 10 shows a flow diagram of a method for testing an optical fiber cable.

FIG. 10 shows a flow diagram of a method 1000 for testing an optical fiber cable 104. The optical fiber cable 104 may be a multimode or a singlemode optical fiber cable. When the optical fiber cable 104 is a multimode optical fiber cable 104, the optical power or loss of the optical fiber cable 104 may be tested at multimode transmission wavelengths, such as 850 nm and 1300 nm. When the optical fiber cable 104 is a singlemode optical fiber cable 104, the optical power or loss of the optical fiber cable 104 may be tested at singlemode transmission wavelengths, such as 1310 nm and 1550 nm.

The method 1000 may be performed by an optical testing device, such as the optical testing device 100 described with reference to FIG. 1. The optical testing device may be equipped with a Visual Fault Detector as described herein and may emit visible light. Further, the optical testing device may be equipped with an image sensor that determines the positions where visible light optical signals impinged on the image sensor. The polarity of the optical fiber cable 104 may be determined based at least in part on the positions determined by the image sensor as described herein.

In the method 1000, an optical testing device, such as the optical testing device 100 described with reference to FIG. 1, at 1002 emits, through an optical fiber 106 of the optical fiber cable 104, a first optical signal having a first wavelength within the visible light spectrum. Further, the first optical signal may have a wavelength in near infrared (NIR) or short wave infrared (SWIR) range. For example, the first optical signal may have a wavelength of up to 1000 nm. The image sensor detects, at 1004, a position where the first optical signal impinged on the image sensor. The image sensor outputs the position to the processor 116.

After emitting the first optical signal, the optical testing device proceeds to test the optical power or loss of the optical fiber cable 104. The optical testing device emits, at 1006, a second optical signal through the optical fiber 106 of the optical fiber cable 104. The second optical signal has a second wavelength. When the optical fiber cable 104 is a multimode cable, the second wavelength may be a multimode transmission wavelength, such as 850 nm. When the optical fiber cable 104 is a singlemode cable, the second wavelength may be a singlemode transmission wavelength, such as 1310 nm.

The second optical signal is captured by a photodetector, such as the photodetector 120, described with reference to FIG. 2. At 1008, the photodetector detects an intensity of the second optical signal. The photodetector outputs the detected intensity to the processor 116 as described herein.

At 1010, the processor 116 then emits a third optical signal through the optical fiber 106 of the optical fiber cable 104. The third optical signal has a third wavelength. If the optical fiber 106 or cable 104 is multimode, the third wavelength may be a multimode transmission wavelength, such as 1300 nm. If the optical fiber 106 or cable 104 is singlemode, the third wavelength may be a singlemode transmission wavelength, such as 1550 nm.

The third optical signal is captured by a photodetector, such as the photodetector 120, described with reference to FIG. 2. At 1012, the photodetector detects an intensity of the third optical signal. The photodetector outputs the detected intensity to the processor 116 as described herein.

The processor 116 then determines at 1014 whether all of the optical fibers of the optical fiber cable (or optical fiber array 110) have been tested. If a negative determination is made, the optical testing device tests a next optical fiber at 1014, whereby steps 1002-1012 are performed for the next optical fiber.

If a positive determination is made, the processor 116 at 1018 outputs the polarity of the optical fiber cable and the optical power or loss for the second and third wavelengths. The polarity is determined based on position information detected by the image sensor.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An optical testing device, comprising:
a position sensing detector having an optical sensing area that consists of a single integrated substrate having a first material that is photosensitive to a first range of wavelengths, the position sensing detector being configured to:
receive a plurality of first optical signals emitted through a respective plurality of optical fibers of an optical fiber cable, the plurality of first optical signals having wavelengths within the first range of wavelengths;
detect a plurality of positions on the single integrated substrate where the plurality of first optical signals respectively impinge on the single integrated substrate;
detect a plurality of first optical intensities of the plurality of first optical signals, respectively; and
output data representative of the plurality of positions and the plurality of first optical intensities; and
a photodetector of a second material that is different than the first material and is photosensitive to a second range of wavelengths different than the first range of wavelengths, the photodetector being configured to:
receive a plurality of second optical signals emitted through the plurality of optical fibers of the optical fiber cable, respectively, the plurality of second optical signals having wavelengths within the second range of wavelengths.

2. The optical testing device of claim 1, wherein the photodetector is configured to:
detect a plurality of second optical intensities of the plurality of second optical signals, respectively; and
output data representative of the plurality of second optical intensities.

3. The optical testing device of claim 2, further comprising:
a processor configured to:
receive the data representative of the plurality of positions, the data representative of the plurality of first optical intensities, and the data representative of the plurality of second optical intensities;
determine a polarity of the optical fiber cable based on the data representative of the plurality of positions;
determine an optical loss of at least one first optical signal based on a first optical intensity of the plurality of first optical intensities;
determine an optical loss of at least one second optical signal based on a second optical intensity of the plurality of second optical intensities; and
output the determined polarity of the optical fiber cable, the optical loss of the at least one first optical signal, and the optical loss of the at least one second optical signal.

4. The optical testing device of claim 3, wherein the processor configured to:
receive information indicating an order in which the plurality of first optical signals were received by the position sensing detector; and
determine the polarity of the optical fiber cable based on:
the information indicating the order in which the plurality of first optical signals were received, information indicating an order in which the plurality of first optical signals were emitted through the plurality of optical fibers, and the data representative of the plurality of positions.

5. The optical testing device of claim 3, wherein the position sensing detector is configured to detect a respective plurality of signatures of the plurality of first optical signals and output data representative of the respective plurality of signatures, and wherein the processor configured to:
receive the data representative of the respective plurality of signatures;
determine a plurality of transmitting positions of the plurality of first optical signals based on the data representative of the respective plurality of signatures;
determine the polarity of the optical fiber cable based on:
the plurality of transmitting positions, and the data representative of the plurality of positions on the single integrated substrate where the plurality of first optical signals respectively impinge on the single integrated substrate.

6. The optical testing device of claim 1, wherein the position sensing detector and the photodetector are stacked such that at least a portion of the position sensing detector overlaps with the photodetector at least a portion of a sensory field of the photodetector.

7. The optical testing device of claim 6, wherein the position sensing detector is configured to pass light having wavelengths outside of the first range of wavelengths and wherein the wavelength of the plurality of second optical signals is outside the first range of wavelengths and the photodetector is configured to receive the plurality of second optical signals after the plurality of second optical signals pass through the position sensing detector.

8. The optical testing device of claim 1, wherein the position sensing detector is positioned in the optical testing device such that the position sensing detector does not cover any portion of a sensory field of the photodetector.

9. The optical testing device of claim 8, further comprising:
a wavelength-selective optical splitter positioned to receive the plurality of first optical signals and the plurality of second optical signals and configured to:
selectively output the plurality of first optical signals having wavelengths within the first range of wavelengths to the position sensing detector; and
selectively output the plurality of second optical signals having a wavelength within the second range of wavelengths to the photodetector.

10. The optical testing device of claim 1, wherein the first material is silicon and the second material is germanium or indium gallium arsenide.

11. The optical testing device of claim 1, wherein the first range of wavelengths is 350 to 1000 nm and the second range of wavelengths is 700 to 1600 nm.

12. The optical testing device of claim 1, wherein the plurality of optical fibers are singlemode optical fibers or multimode optical fibers.

13. The optical testing device of claim 1, wherein the position sensing detector and the photodetector are stacked with a bonding agent therebetween.

14. The optical testing device of claim 1, wherein the position sensing detector is coated with a reflective coating configured to pass light having wavelengths within the first range of wavelengths and reflect light having wavelengths outside of the first range of wavelengths and within the second range of wavelengths.

15. The optical testing device of claim 14, wherein the photodetector is positioned to receive the light reflected by the reflective coating.

16. An optical testing device, comprising:
a position sensing detector having an optical sensing area that consists of a single integrated substrate having a first material that is photosensitive to a first range of wavelengths, the position sensing detector being configured to:

receive a plurality of first optical signals emitted through a respective plurality of optical fibers of an optical fiber cable, the plurality of first optical signals having wavelengths within the first range of wavelengths;

detect a plurality of positions on the single integrated substrate where the plurality of first optical signals respectively impinged on the single integrated substrate; and output data representative of the plurality of positions; and a photodetector of a second material that is different than the first material and is photosensitive to a second range of wavelengths different than the first range of wavelengths, the photodetector being configured to:

receive a plurality of second optical signals emitted through the plurality of optical fibers of the optical fiber cable, respectively, the plurality of second optical signals having wavelengths within the second range of wavelengths;

receive a plurality of third optical signals emitted through the plurality of optical fibers of the optical fiber cable, respectively, the plurality of third optical signals having wavelengths within the second range of wavelengths and different than wavelengths of the plurality of second optical signals;

detect a plurality of first intensities of the plurality of second optical signals, respectively;

detect a plurality of second intensities of the plurality of third optical signals, respectively; and output data representative of the plurality of first intensities and data representative of the plurality of second intensities.

17. The optical testing device of claim 16, further comprising:

a processor configured to:

receive the data representative of the plurality of positions, the data representative of the plurality of first intensities, and the data representative of the plurality of second intensities;

determine a polarity of the optical fiber cable based at least in part on the data representative of the plurality of positions;

determine an optical loss of at least one second optical signal of the plurality of second optical signals based on a corresponding first intensity of the plurality of first intensities;

determine an optical loss of at least one third optical signal of the plurality of third optical signals based on a corresponding second intensity of the plurality of second intensities; and output the determined polarity of the optical fiber cable, the optical loss of the at least one second optical signal, and the optical loss of the at least one third optical signal.

18. The optical testing device of claim 16, wherein the position sensing detector and the photodetector are stacked with a bonding agent therebetween.

19. The optical testing device of claim 16, wherein the position sensing detector is coated with a reflective coating configured to pass light having wavelengths within the first range of wavelengths and reflect light having wavelengths outside of the first range of wavelengths and within the second range of wavelengths.

20. The optical testing device of claim 19, wherein the photodetector is positioned to receive the light reflected by the reflective coating.

21. An optical testing device, comprising:

an image sensor having an optical sensing area consisting of a single integrated substrate that is optically responsive to a first range of wavelengths including at least a portion of the visible light spectrum, the image sensor being configured to:

receive a plurality of first optical signals emitted through a respective plurality of optical fibers of an optical fiber cable, the plurality of first optical signals having wavelengths within the first range of wavelengths;

detect a plurality of positions on the single integrated substrate where the plurality of first optical signals respectively impinge on the single integrated substrate; and output data representative of the plurality of positions; and a photodetector that is optically responsive to a second range of wavelengths different than the first range of wavelengths, the photodetector being configured to:

receive a plurality of second optical signals emitted through the plurality of optical fibers, respectively, the plurality of optical signals having wavelengths within the second range of wavelengths;

detect a plurality of optical intensities of the plurality of second optical signals, respectively; and output data representative of the plurality of optical intensities.

22. The optical testing device of claim 21, further comprising:

a processor configured to:

receive the data representative of the plurality of positions and the data representative of the plurality of optical intensities;

determine a polarity of the optical fiber cable based on the data representative of the plurality of positions; and determine a respective plurality of optical losses or optical intensities based on the plurality of optical intensities of the plurality of second optical signals.

23. The optical testing device of claim 21, wherein first range of wavelengths includes at least the portion of the visible light spectrum and an optical range that lies between an end of the visible light spectrum and 1000 nm.

* * * * *